United States Patent

Pedersen

[15] 3,665,938

[45] May 30, 1972

[54] HAIR ROLLER CONTAINING TEMPERATURE INDICATOR

[72] Inventor: Arne Bybjerg Pedersen, Hovvejen, Kalundborg, Denmark

[73] Assignee: Bristol Myers Company, New York, N.Y.

[22] Filed: Jan. 27, 1970

[21] Appl. No.: 6,332

Related U.S. Application Data

[63] Continuation-in-part of Ser. No. 612,102, Jan. 27, 1967, abandoned.

[52] U.S. Cl. ............................. 132/33 R, 34/96, 132/39 R, 219/222, 252/408
[51] Int. Cl. ........................................ A45d 2/12, C09k 3/04
[58] Field of Search ................ 252/408; 34/96; 132/33, 39; 219/222

[56] References Cited

UNITED STATES PATENTS

| 3,257,541 | 6/1966 | Jorgensen | 132/33 R |
| 1,693,369 | 11/1928 | Cochran | 252/408 X |
| 2,892,798 | 6/1959 | Dobbs | 252/408 |
| 3,078,182 | 2/1963 | Crone | 252/408 X |
| 3,352,794 | 11/1967 | Abdo | 252/408 |

Primary Examiner—Robert F. Burnett
Assistant Examiner—M. E. McCamish
Attorney—Waters, Roditi, Schwartz & Nissen

[57] ABSTRACT

A temperature indicator which consists of a suspension of a cuprous mercuric iodide complex in a transparent carrier, which is able to protect the complex indicator compound against deterioration from sublimation of the mercuric part of the complex and to protect the same against the detrimental influence from the ambient atmosphere such as oxygen. The indicator may be further protected by a transparent cured cover, and it will change its color at 65°–75° C from red to black, when heated and back again to red when cooled. These temperature indicators are particularly adopted for use on heated hair rollers to identify to the user, when each roller is ready for use.

9 Claims, No Drawings

HAIR ROLLER CONTAINING TEMPERATURE INDICATOR

CROSS-RELATED APPLICATION

This application is a C-I-P of my earlier application Ser. No. 612,102 filed Jan. 27, 1967 and now abandoned.

BRIEF SUMMARY OF THE INVENTION

The present invention relates to a temperature indicator consisting of a cuprous mercuric iodide complex incorporated in a transparent carrier. When heated to a temperature which is characteristic for the complex, the indicator changes color, and the indicator reverts to the starting color when cooled below the characteristic temperature.

Temperature indicators similar to the aforesaid are known.

By way of example, U.S. Pat. No. 1,693,369 describes a mixture of cuprous iodide and mercuric iodide incorporated in transparent carriers such as varnishes, resins or plastic materials. The color changing pigment is a mixture and the mercuric iodide part, which represents about 70 per cent of the mixture will easily precipitate, when suspended in the transparent varnish, due to the higher density, leaving the non-color changing cuprous iodide as a top layer thus making the indicator non-operable. Furthermore the mercuric iodide part of the mixture will tend to sublimate from the top layer when heated, whereby the temperature indicator will have very short durability. Finally, oxygen may penetrate the varnish and in combination with the heat, oxidize the cuprous iodide to form a dark composition, which is then unable to change color.

U.S. Pat. No. 3,352,794 describes a reversible temperature indicator incorporated in a resin or varnish. The color changing pigment of the indicator consists of an impure iodide of silver and mercury and the indicator is operative between 27° and 218° C during which the pigment gradually changes color from yellow to orange to red to maroon to purple and to black. This indicator is not able to give a sharp change in color at a particular temperature at which preheated hair rollers are usable.

Temperature indicators, where the color changing pigments are dispersed in transparent carriers such as resins or varnishes are also disclosed in U.S. Pat. No. 3,386,807, which describes the use of a copolymer of polyvinyl chloride and polyvinyl acetate as a transparent carrier. This carrier has permeability to steam in order to usable in connection with the indicator pigment which is employed. Such permeability, however, is absolutely intolerable with the indicator according to the invention.

U.S. Pat. No. 3,078,182 describes the use of a copolymer of vinylidene chloride as a carrier for irreversible temperature indicators, which are able to give separate indication as to whether the indicator has been subjected to dry heat, moist heat or actinic radiation. Thus the carrier is permeable to steam.

The known reversible color changing temperature indicators thus suffer from drawbacks which make then unsuitable for use in connection with heated hair rollers.

An object of this invention is to provide a temperature indicator which is adaptable for use with hair rollers at the ordinary operating temperatures thereof and which overcomes the known drawbacks. The indicator has the following characteristics:

1. it is reversible in color at a particular temperature.
2. It distinctly changes color from red to maroon/black when heated to a temperature between 65° to 75° C, and instantly shows reverse color change when cooled below this temperature.
3. the tolerance of the color change is less than $\pm 2°$ C.
4. the indicator is continuously operable for more than 1,000 hours, which represents more than 10 years of regular use of heated hair rollers.
5. the color changing pigment is a chemical complex compound which will disintegrate by precipitation as the mixed pigments of the known indicators when suspended in a carrier.

According to the invention the color changing pigments have the formula $x$ CuI, $y$ HgI$_2$ where $x$ and $y$ refer to the same or different integers between 1 and 6. These complexes are synthesized in known manner from potassium iodide, cupric sulfate and mercuric chloride and the like. In a particular embodiment, $y$ is 1 and $x$ is 1 or 2.

The single dried complex is ball-milled and sifted, and then mixed with the transparent carrier.

The transparent carrier consists of a varnish or a lacquer which in dry condition has very little permeability to sublimizing mercuric iodide and to oxygen. For example there may be employed a copolymer of monochlorotrifluoroethylene and vinylidene fluoride, known as Kel-F, or polyvinylacetate. The two carriers are not limiting with respect to the scope of the invention are are only offered by way of example.

Suitable solvents for the carriers are methylethylketone, toluene or ethylacetate.

The mixture of color changing pigment and transparent carrier is painted on the objects where the surface temperature is to be checked, e.g., at the top or side of a heat retaining hair roller. After drying, the indicator is ready for use.

It is to be understood that the temperature indicator can be applied to the hair roller in other ways within the scope of the invention. Thus the indicator may be placed on a foil, which is then transferred to the object, or the object can be inscribed with a printing ink made from the chemical complex.

To protect the temperature indicator from mechanical damage and thereby to prolong the life of the indicator, it is sealed within a transparent cover, which may be applied as a curable layer consisting, for example, of unsaturated polyester or applied as a foil consisting, for example, of a polyolefin or a saturated polyester.

As a result, the obtained temperature indicator is specially suited for objects, which are used frequently, e.g., at least twice a week, and the indicator will retain its temperature indicating property without change for many years.

DETAILED DESCRIPTION

The following examples set forth embodiments of this invention, but are in no way limiting.

EXAMPLE I 1.0 g of Kel-F resin is dissolved in 1.0 g methylethylketone and to the resulting solution is added 1.0 g cuprous mercuric triiodide (CuHgI$_3$). After stirring, a paint is obtained which is applied dropwise in small bores at the top of a hair roller. When the solvent has evaporated from the paint, each indicator dot is covered with a layer of an unsaturated polyester, which is pre-mixed with 1 per cent peroxide hardener e.g. cyclohexanone peroxide and 0.01 per cent of a cobalt accelerator, e.g. cobalt octoate. When the cover has hardened, the indicator is ready for use and tests made on hair rollers show the indicators completely faultless after storage at 100° C for 1,000 hours.

EXAMPLE II 4.2 g of polyvinylacetate are dissolved in 2.8 g of ethylacetate and 6.0 g of toluene. To the solution are added 7.0 g of cuprous mercuric tetraiodide (Cu$_2$HgI$_4$) and the solution is stirred to form a paint. A 0.1 mm. thick polyester foil is coated with the resulting stirred paint and dried. Suitable size pieces are stamped out from the coated foil and placed on hair rollers made from polypropylene. Corresponding shaped pieces are stamped from a 0.1 mm. thick polypropylene foil and placed over the indicator dots. This cover is then welded in known manner to the polypropylene surface of the hair roller, thus sealing the indicator dot from physical damage. Tests show the indicator to be completely faultless after storage at 100° C for 1,000 hours.

The invention is useful when it is necessary to indicate if a varying surface temperature is above or below 65° to 75° C. The temperature indicator according to the invention can particularly be used on hair rollers, which prior to their use are heated to a surface temperature of about 75° C, which is necessary to give an effective curling within 10–15 minutes, determined by the thermal capacity of the hair roller.

Particular embodiments of the invention have been used to illustrate the same. The invention, however, is not limited to these embodiments. In view of the foregoing disclosure, variations or modifications thereof will become apparent to those skilled in the art within the scope of the invention as defined by the appended claims.

What is claimed is:

1. A heatable hair roller having a temperature indicator for visually indicating a predetermined temperature for the hair roller during use, said indicator consisting essentially of a chemical composition suspended in a transparent carrier, said indicator having reversible color change at the predetermined temperature, said composition being an inorganic chemical complex compound consisting of cuprous mercuric iodide having the formula $x$ CuI, $y$ HgI$_2$ wherein $x$ and $y$ are the same or different integers between 1 and 6; a transparent cured film of plastic, said indicator being placed on said hair roller and being covered by and sealed from the ambient atmosphere by said transparent cured film of plastic.

2. A hair roller as claimed in claim 1 wherein said transparent cured film of plastic consists of a polyester or a polyolefin.

3. A hair roller as claimed in claim 1 wherein $y$ is 1 and $x$ is 1 or 2.

4. A hair roller as claimed in claim 1 wherein said complex has a color change at a temperature between 65° and 75° C.

5. A hair roller as claimed in claim 4 wherein said carrier is constituted of a material which is substantially impermeable to oxygen and to sublimizing mercuric iodide from said complex.

6. A hair roller as claimed in claim 1 wherein the hair roller includes a roller member constituted of polypropylene and said film is polypropylene and is welded to said roller member with the indicator interposed therebetween.

7. A hair roller as claimed in claim 1 wherein the hair roller includes a roller member and the indicator is painted on said roller member.

8. A hair roller as claimed in claim 1 wherein the hair roller includes a roller member and the indicator is mounted on a foil applied to the roller member.

9. A hair roller as claimed in claim 1 wherein the hair roller includes a roller member and said film is a polyester joined to said roller member with the indicator interposed therebetween.

* * * * *